US007719651B2

(12) United States Patent
Lee et al.

(10) Patent No.: US 7,719,651 B2
(45) Date of Patent: May 18, 2010

(54) IN-PLANE SWITCHING LIQUID CRYSTAL DISPLAY DEVICE

(75) Inventors: Yun Bok Lee, Seoul (KR); Min Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 95 days.

(21) Appl. No.: 11/133,440

(22) Filed: May 20, 2005
(Under 37 CFR 1.47)

(65) Prior Publication Data
US 2005/0275783 A1 Dec. 15, 2005

(30) Foreign Application Priority Data
May 22, 2004 (KR) .................. 10-2004-0036663

(51) Int. Cl.
*G02F 1/1343* (2006.01)
(52) U.S. Cl. .................. 349/141; 349/139; 349/143; 349/138
(58) Field of Classification Search .................. 349/141, 349/143, 146, 147, 139, 138, 123, 106, 110
See application file for complete search history.

(56) References Cited

U.S. PATENT DOCUMENTS

| | | | |
|---|---|---|---|
| 6,292,245 | B1 | 9/2001 | Lee et al. |
| 6,680,772 | B2 * | 1/2004 | Lee .................. 349/141 |
| 6,937,312 | B2 * | 8/2005 | Kadotani et al. .................. 349/141 |
| 7,177,001 | B2 * | 2/2007 | Lee .................. 349/141 |
| 2001/0043304 | A1 * | 11/2001 | Matsumoto .................. 349/141 |
| 2002/0054267 | A1 | 5/2002 | Matsumoto et al. |
| 2002/0191139 | A1 * | 12/2002 | Kim et al. .................. 349/141 |
| 2004/0051834 | A1 * | 3/2004 | Lee .................. 349/141 |
| 2004/0090564 | A1 * | 5/2004 | Lee .................. 349/43 |
| 2005/0083468 | A1 * | 4/2005 | Chen et al. .................. 349/141 |
| 2005/0128409 | A1 * | 6/2005 | Lee .................. 349/141 |

FOREIGN PATENT DOCUMENTS

| | | |
|---|---|---|
| JP | 55-060917 A | 5/1980 |
| JP | 11-237648 A2 | 8/1999 |
| JP | 2001-154214 A | 6/2001 |
| JP | 2002-055357 A | 2/2002 |
| JP | 2002-148634 A2 | 5/2002 |
| JP | 2000-3015146 A | 1/2003 |

OTHER PUBLICATIONS

Ohno, Hiroshi, et al. Field-induced microdomain liquid-crystal display modes. Journal of Applied Physics, vol. 93, No. 12. Jun. 15, 2003. pp. 9630-9633.*

* cited by examiner

*Primary Examiner*—Thoi V Duong
(74) *Attorney, Agent, or Firm*—McKenna Long & Aldridge LLP

(57) ABSTRACT

An in-plane switching liquid crystal display device including: first and second substrates; a gate line and data line arranged vertically and horizontally, respectively, on the first substrate and defining a pixel region; a thin film transistor (TFT) formed at a crossing of the gate line and the data line; common electrodes and pixel electrodes alternately disposed in the pixel region in a curvature form and generating an in-plane electric field; a common electrode connection line electrically connecting the common electrodes; a pixel electrode connection line electrically connecting pixel electrodes; a compensation electrode formed along at least one of the common electrode connection line and the pixel electrode connection line and compensating electric field; and a liquid crystal layer formed between the first and second substrates.

7 Claims, 7 Drawing Sheets

○: VOLATAGE UNAPPLIED   ○: VOLATAGE APPLIED   ↑: RUBBING DIRECTION

IN-PLANE SWITCHING LIQUID CRYSTAL DISPLAY DEVICE

This application claims the benefit of Korean Patent Application No. 2004-36663, filed on May 22, 2004, which is hereby incorporated by reference for all purposes as if fully set forth herein.

BACKGROUND OF THE INVENTION

1. Field of the Invention

The present invention relates to an in-plane liquid crystal display (LCD) having electrodes with a curvature. More particularly, the present invention relates to an in-plane LCD capable of compensating a viewing angle in all directions by disposing a plurality of pixel electrodes and common electrodes, which generate an in-plane electric field, in a circular form, and capable of enhancing light efficiency by forming a compensation electrode at a region where disclination may occur as pixel electrodes and common electrodes cross an electrode connection line formed for electrical connection therebetween at an angle smaller than a right angle.

2. Description of the Related Art

With the development of the information society, various demands for display devices are increasing, and research for flat panel display such as an LCD (Liquid Crystal Display), PDP (Plasma Display Panel), an ELD (Electro Luminescent Display), an FED (Field Emission Display), a VFD (Vacuum Fluorescent Display) is actively ongoing. Of these displays, the LCD is most spotlighted because of its implementation of high picture quality, mass-production techniques, easiness of a driving unit, light weight, thinness, and low power consumption.

A LCD is divided into a liquid crystal panel for displaying images and a driving unit for applying a drive signal to the liquid crystal panel. The liquid crystal panel is divided into first and second substrates and a liquid crystal layer inserted between the first and second substrates.

The LCD has various display modes based upon an arrangement of fine, long liquid crystal molecules. Among the display modes, a TN (Twisted Nematic) mode LCD is advantageous in that it can easily display black and white and has a quick response speed and low driving voltage. However, in the TN mode, liquid crystal molecules are vertically aligned due to a vertically applied electric field. Hence, viewing angle characteristics are not good due to the refraction index anisotropy of the liquid crystal molecules. Thus, in order to overcome the shortcomings of the TN mode, a new technique, namely, an in-plane LCD, has been proposed.

The in-plane LCD is constructed such that when a voltage is applied, a horizontal electric field (in-plane) is formed on a plane to align the liquid crystal molecules on the plane to obtain wider viewing angle characteristics compared with the existing TN mode LCD.

FIG. 1 is a plan view of a unit pixel of an in-plane LCD in accordance with the related art, and FIG. 2 is a sectional view taken along line A-A' of FIG. 1.

As shown in FIGS. 1 and 2, the in-plane LCD includes a data line 100 and a gate line 101 arranged on a first substrate 103 and defining a pixel region, a thin film transistor (TFT) (T) disposed at a crossing of the gate line 101 and the data line 100, and a pixel electrode 119 and a common electrode 111 formed approximately parallel to the data line 100.

The TFT (T) includes a gate electrode 110 formed on the first substrate 103 and connected with the gate line 101, a gate insulation film 113 staked on the gate electrode 110, a semiconductor layer 115 formed on the gate insulation film 113, an ohmic contact layer 116 formed on the semiconductor layer 115, and a source electrode 117 and a drain electrode 118 formed on the ohmic contact layer 116 and connected with the data line 100 and the pixel electrode 119, respectively.

The common electrode 111 is formed on the first substrate and connected with a common line 105, and the pixel electrode 119 is formed on the gate insulation film 113 and connected with the drain electrode 118 of the TFT (T).

A passivation film 120 is stacked over the entire surface of the substrate including the TFT, the pixel electrode 119 and the gate insulation film 113, on which a first alignment film (not shown) is coated and an alignment direction of the liquid crystal layer is determined. The liquid crystal molecules 102 are aligned in a rubbing direction between the common electrode 111 and the pixel electrode 119 when no voltage is applied thereto.

A light blocking layer 106 for preventing leakage of light, a color filter layer 107 consisting of R, G and B color filters, and an overcoat layer 108 are sequentially stacked on the second substrate 104 which corresponds to the first substrate 103.

The in-plane switching (IPS) LCD can be viewed at the front side in about a 70° direction up/down and leftward/rightward, obtaining a wide viewing angle compared with the existing TN mode. And, because the main viewing angle directions at different two domains formed by zigzag type electrodes are symmetrical, color shift is mutually compensated, not causing the color shift.

However, the IPS LCD has a limitation in improving the viewing angle characteristics. In other words, compared with the TN mode LCD, the two domain IPS LCD has better viewing angle characteristics and color shift characteristics. But when compared with the existing CRT, the viewing angle and color shift characteristics of the IPS LCD are still problematic.

SUMMARY OF THE INVENTION

Accordingly, the present invention is directed to an in-plane switching liquid crystal display device that substantially obviates one or more of the problems due to limitations and disadvantages of the related art.

An advantage of the present invention is to provide an in-plane switching (IPS) LCD capable of compensating a viewing angle in all directions by alternately disposing a plurality of pixel electrodes and a plurality of common electrodes which generate in-plane electric field in a curvature form.

Another advantage of the present invention is to provide an in-plane switching (IPS) LCD capable of minimizing a disclination phenomenon and enhancing light efficiency by forming a compensation electrode at a region where a pixel electrode and a pixel electrode connection line which are formed for electrically connecting the pixel electrode cross at an angle smaller than a right angle and at a region where a common electrode and a common electrode connection line, which are formed for electrically connecting the common electrodes cross at an angle smaller than a right angle.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an in-plane switching (IPS) LCD including: first and second substrates; a gate line and a data line arranged vertically and horizontally, respectively, on the first substrate and defining a pixel region; a thin film transistor (TFT) formed at a crossing of the gate line and the data line; common electrodes and pixel electrodes alternately disposed in the pixel region in a curvature form and generating an in-plane electric field; a common electrode connection line electrically connecting the common electrodes; a pixel electrode connection line electrically connecting pixel electrodes; a compensation electrode formed along at least one of the common electrode connection line and the pixel electrode connection line and compensating the in-plane electric field; and a liquid crystal layer formed between the first and second substrates.

In another aspect of the present invention, an in-plane switching (IPS) LCD includes: first and second substrates; a gate line and a data line arranged horizontally and vertically respectively on the first substrate and defining a pixel region; a TFT formed at a crossing of the gate line and the data line; first and second electrodes alternately disposed in the pixel region in a curvature form and generating an in-plane electric field in a first direction; a first electrode connection line electrically connecting the first electrodes; a second electrode connection line electrically connecting the second electrodes; a third electrode formed along at least one of the first and second electrode connection lines and forming an in-plane electric field in a first direction with at least one of the first and second electrodes; and a liquid crystal layer formed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

In order to enhance an opening aperture of an LCD, a main viewing angle is compensated by forming a plurality of domains in a pixel. This method is applied not only to the TN mode LCD but also to the in-plane switching (IPS) LCD.

Figure 1:
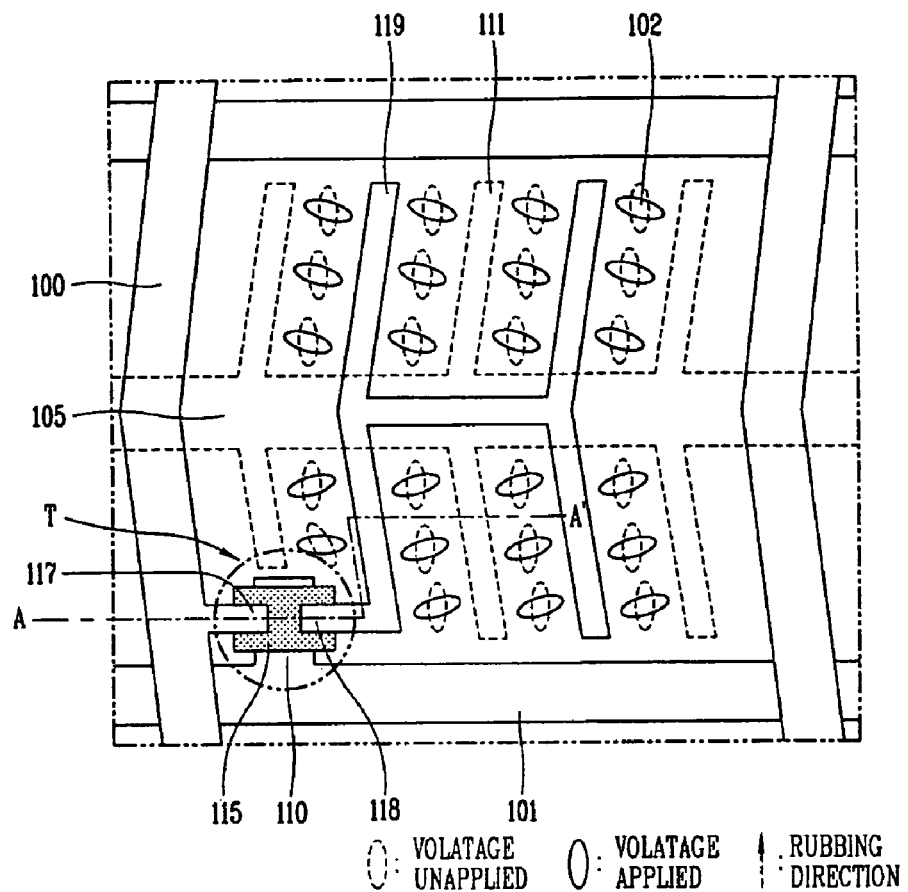
FIG. 1 is a plan view showing a related art in-plane switching (IPS) LCD.
Figure 2:
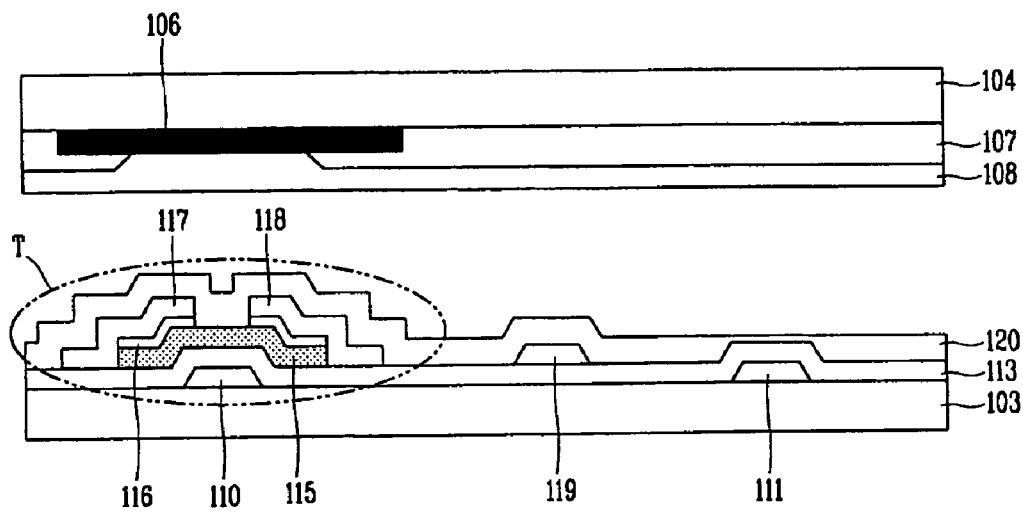
FIG. 2 is a sectional view taken along line A-A' in FIG. 1.

The related art IPS LCD shown in FIG. 1 improves the viewing angle characteristics by dividing the pixel into two domains, but in this case, there is a limitation in improving the viewing angle characteristics.

The present invention provides an IPS LCD capable of improving viewing angle characteristics and preventing color shift by forming a plurality of domains in a pixel. Specifically, in the present invention, a plurality of common electrodes and a plurality of pixel electrodes, which are disposed in a pixel region and generate an in-plane electric field, are formed in a curvature form to thereby divide the pixel region into a plurality of domains. The common electrode and the pixel electrode are arranged in an alternating pattern, between which an in-plane electric field is generated. And, in this case, directions of the in-plane electric field formed respectively at the first circular quadrant, the second circular quadrant, the third circular quadrant and the fourth circular quadrant are perfectly symmetrical, so that the main viewing angle can be completely compensated.

The plurality of common electrodes are connected by a common electrode connection line and the plurality of pixel electrodes are connected by a pixel electrode connection line. The common electrode connection line and the pixel electrode connection line are disposed substantially perpendicular to each other, and a compensation electrode is formed along the common electrode connection line and the pixel electrode connection line to thereby prevent distortion of the in-plane electric field between the common electrodes and the pixel electrodes.

Figure 3:
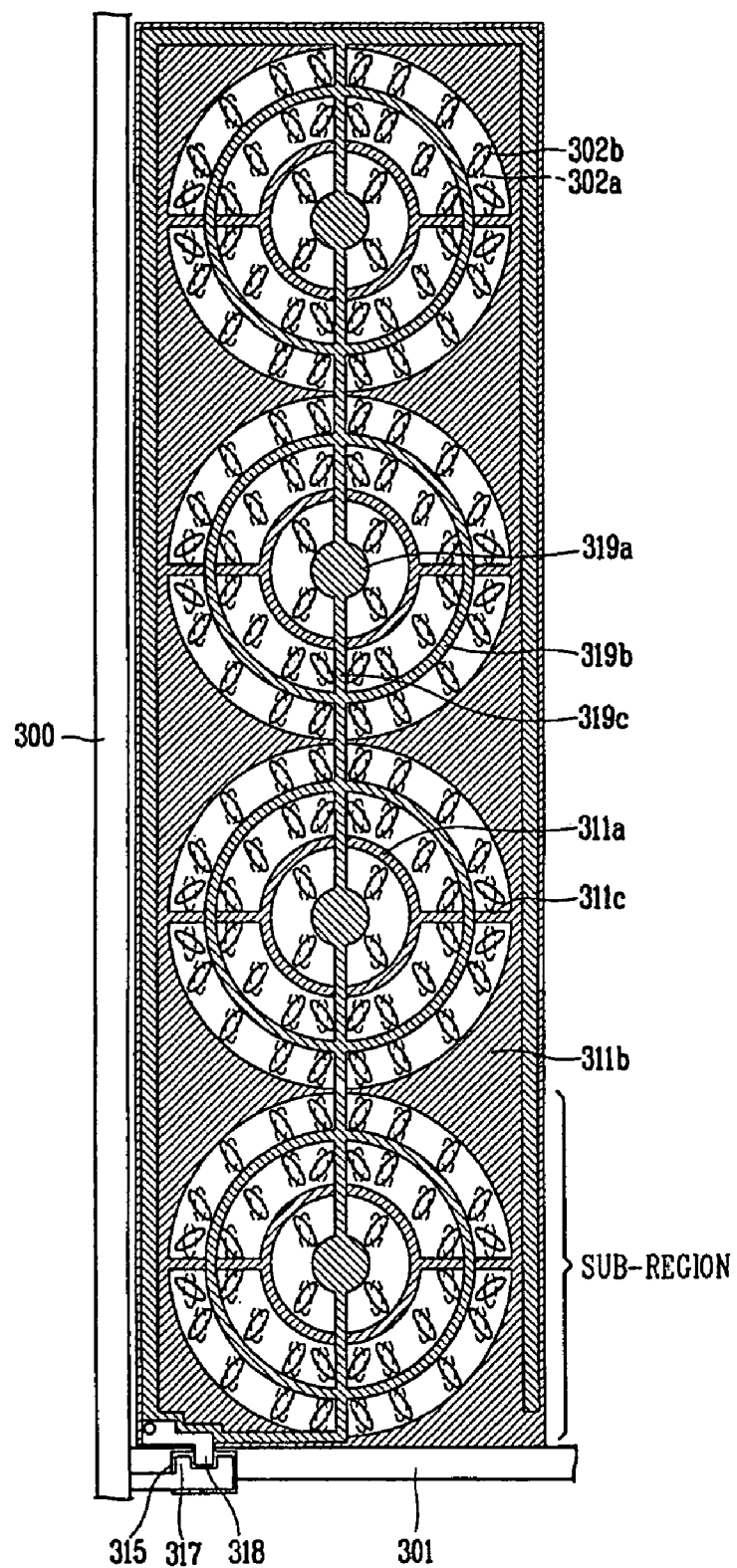
FIG. 3 is a plan view of an IPS LCD in accordance with a first embodiment of the present invention.

FIG. 3 is a plan view of an IPS LCD in accordance with a first embodiment of the present invention.

In the IPS LCD of FIG. 3, one pixel is defined by a group of at least one or more sub-regions.

A circular-shaped first pixel electrode 319a is disposed at the center of a sub-region and a circular-shaped (ring-shaped) first common electrode 311a is perimetrically formed at an outer side of the first pixel electrode 319a with a certain interval therebetween. A circular-shaped (ring-shaped) second pixel electrode 319b is perimetrically disposed at an outer side of the first common electrode 311a with a certain interval therebetween, and a second common electrode 311b with a certain curvature is disposed at an outer side of the second pixel electrode 319b. In other words, the common electrodes 311a and 311b and the pixel electrodes 319a and 319b are alternately and repeatedly disposed with a certain interval therebetween, so that a radial in-plane electric field is used for driving liquid crystals 302b between the first common electrode 311a and the first pixel electrode 319a and between the second common electrode 311b and the second pixel electrode 319b.

A common electrode connection line 311c for electrically connecting the first common electrode 311a and the second common electrode 311b is formed between the first and second common electrodes 311a and 311b, and a pixel electrode connection line 319c for electrically connecting the first pixel electrode 319a and the second pixel electrode 319b is formed between the first and second pixel electrodes 319a and 319b.

The common electrode connection line 311c and the pixel electrode connection line 319c are arranged to be substantially perpendicular to each other. In this example, the common electrode connection line 311c and the pixel electrode connection line 319c may be arranged in various ways so long as they do not overlap with each other.

When a signal is applied to the first and second pixel electrodes 319a and 319b from an external source through the TFT, an in-plane electric field is formed between the first common electrode 311a and the first pixel electrode 319b and between the second common electrode 311b and the second pixel electrode 319b so that liquid crystal molecules 302b are arranged along the direction of the electric field. When no signal is applied to the first and second pixel electrodes 319a and 319b, the liquid crystal molecules 302a are aligned along a rubbing direction. In this case, the rubbing direction is substantially parallel to a data line 300. In the alternative, the rubbing direction may be substantially parallel to a gate line 301.

Figure 4:
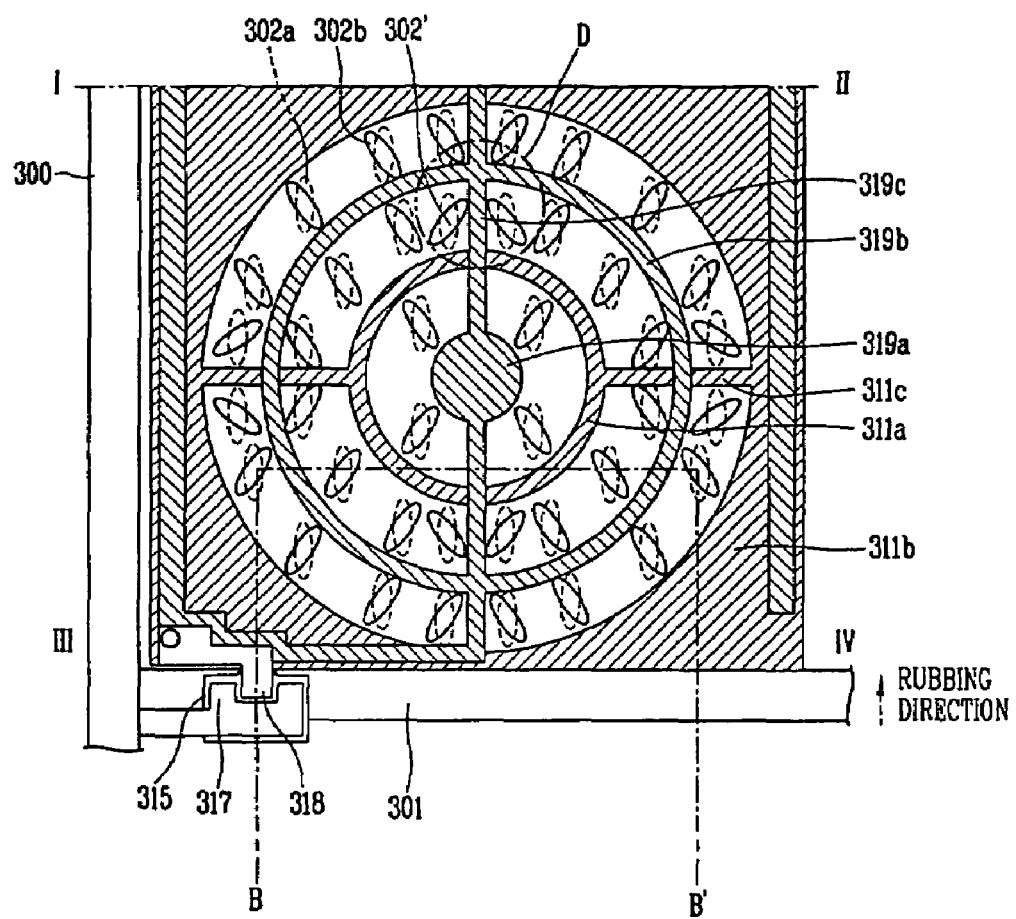
FIG. 4 is an enlarged view of a sub-pixel region in FIG. 3.

FIG. 4 is an enlarged view of a sub-pixel region in FIG. 3.

As shown in FIG. 4, when a signal is applied to the first and second pixel electrodes 319a and 319b, an in-plane electric field is formed between the alternately disposed circular-shaped common electrodes 311a and 311b and the pixel electrodes 319a and 319b, so that the liquid crystal molecules 302b are arranged symmetrically at the regions I, II, III and IV. Namely, the in-plane electric field is formed to radially center around the first pixel electrode 319a. Accordingly, the liquid crystal molecules 302b are also arranged to center around the first pixel electrode 319a. As such, excellent wide viewing angle characteristics can be obtained. In addition, color shift is compensated in a diagonal direction in each pixel region, so that color inversion at a viewing angle of ±45° occurring at the general IPS LCD is completely removed.

Figure 5:
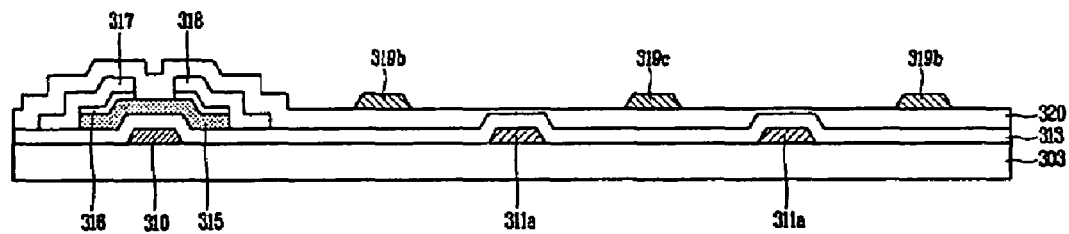
FIG. 5 is a sectional view taken along line B-B' in FIG. 4.

FIG. 5 is a sectional view taken along line B-B' in FIG. 4.

As shown in FIG. 5, first common electrodes 311a made of an opaque metal are formed on a first substrate 303 and second pixel electrodes 319b are formed at regular intervals as a transparent conductor such as ITO (Indium Tin Oxide) on a passivation layer 320. The pixel electrode connection line 319c electrically connects the first and second pixel electrodes 319a and 319b is disposed therebetween.

A thin film transistor (TFT), a driving unit of the pixel, in accordance with the first embodiment of the present invention includes: a gate electrode 310 formed on the first substrate 303, a gate insulation layer 313 made of SiNx or SiOx stacked on the gate electrode 310, a semiconductor layer 315 formed on the gate insulation layer 313, an ohmic contact layer 316 formed on the semiconductor layer 315, a source electrode 317 and a drain electrode 318 respectively formed on the ohmic contact layer 316 and connected with a data line 300 and the pixel electrode 319. A passivation layer 320 is stacked on the entire surface of the first substrate including the upper portion of the TFT.

Generally, five masking processes are performed to fabricate the pixel, and in the present invention, the IPS LCD is fabricated through five steps including: a step of forming the gate electrode 310 and the common electrodes 311a and 311b on the first substrate; a step of forming the semiconductor layer 315 on the gate electrode 310; a step of forming the source electrode 317 and the drain electrode 318 on the semiconductor layer 315; a step of forming the passivation layer 320; and a step of forming the pixel electrode 319.

Figure 6A:
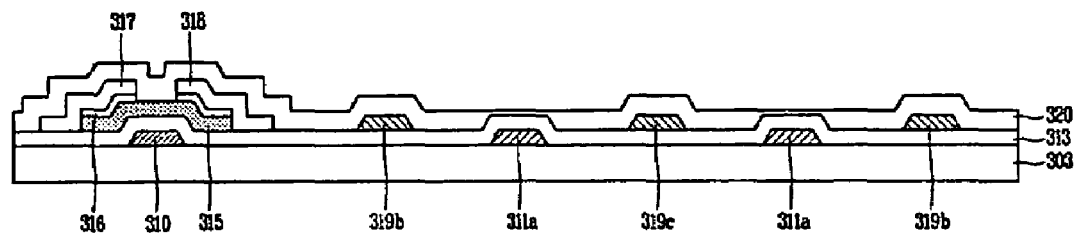
FIGS. 6A and 6B are views showing a different structure of the LCD in accordance with the present invention.
Figure 6B:
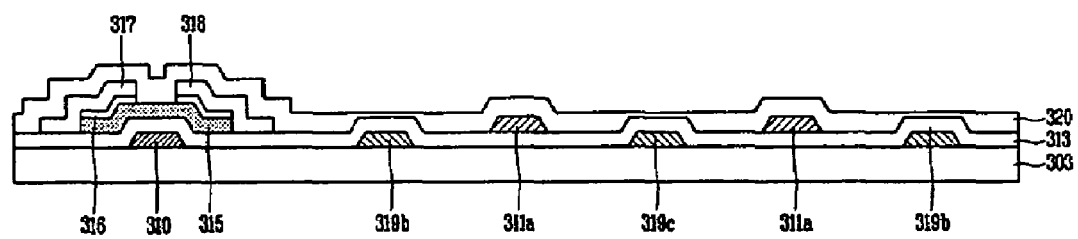

The structure in this embodiment also includes the structure illustrated in FIGS. 6A and 6B. Namely, as illustrated, the common electrodes 311a and 311b and the pixel electrodes 319a and 319b can be formed as an opaque metal on a mutually different layer. Also, though not shown, the common electrodes 311a and 311b and the pixel electrodes 319a and 319b can be all formed as a transparent conductor on the passivation layer 320.

The common electrode connection line 311c and the pixel electrode connection line 319c can be formed of the same material on the same layer as the common electrodes 311a and 311b and the pixel electrodes 319a and 319b, respectively. The common electrodes 311a and 311b and the pixel electrodes 319a and 319b may include any structure having a curvature as well as a simple circular shape.

The IPS LCD having the above-described structure generates a radially formed in-plane electric field to compensate the viewing angle in all directions, so that the characteristics of the wide viewing angle of the LCD can be enhanced.

However, as shown in FIG. 4, the electrode structure of the IPS LCD includes a region where the common electrodes 311a and 311b and the common electrode connection line 311c are connected at an angle smaller than a right angle and a region where the pixel electrodes 319a and 319b and the pixel electrode connection line 319c are connected at an angle smaller than the right angle. A region 'D' as shown in FIG. 4 illustrates one example, in which the second pixel electrode 319b and the pixel electrode connection line 319c intersect at an angle smaller than a right angle.

Figure 11A:
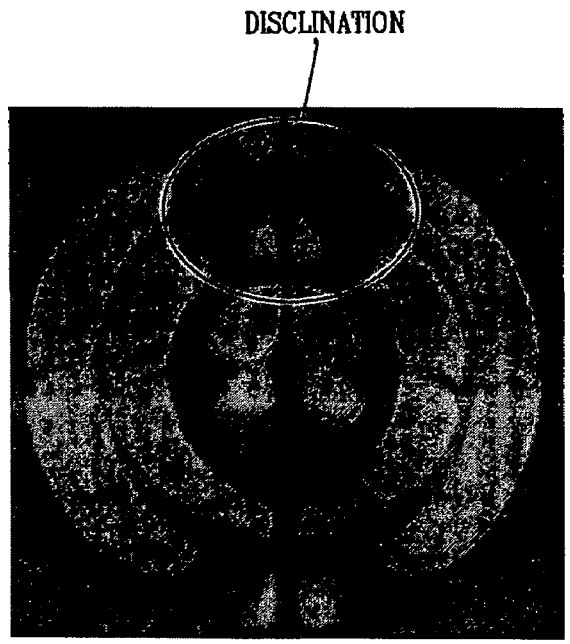
FIG. 11a shows an image indicating a disclination region when a voltage of 6V is applied in the IPS LCD in accordance with the first embodiment of the present invention.

When a voltage is applied to the region 'D', a direction of an electric field is inverted to distort the in-plane electric field between the first common electrode 311a and the second pixel electrodes 319b, and accordingly, an alignment direction of the liquid crystal molecules 302' is also distorted. The distortion of the alignment of the liquid crystal molecules makes light transmittance at the corresponding region different to cause a phenomenon that a display screen is shown black, which is called disclination. The disclination phenomenon can cause a delay of a response of liquid crystal driving, a residual image appearing on the display screen, and reduction of luminance of the LCD. FIG. 11A shows an example of the disclination phenomenon appearing in the pixel region of the LCD.

Figure 7:
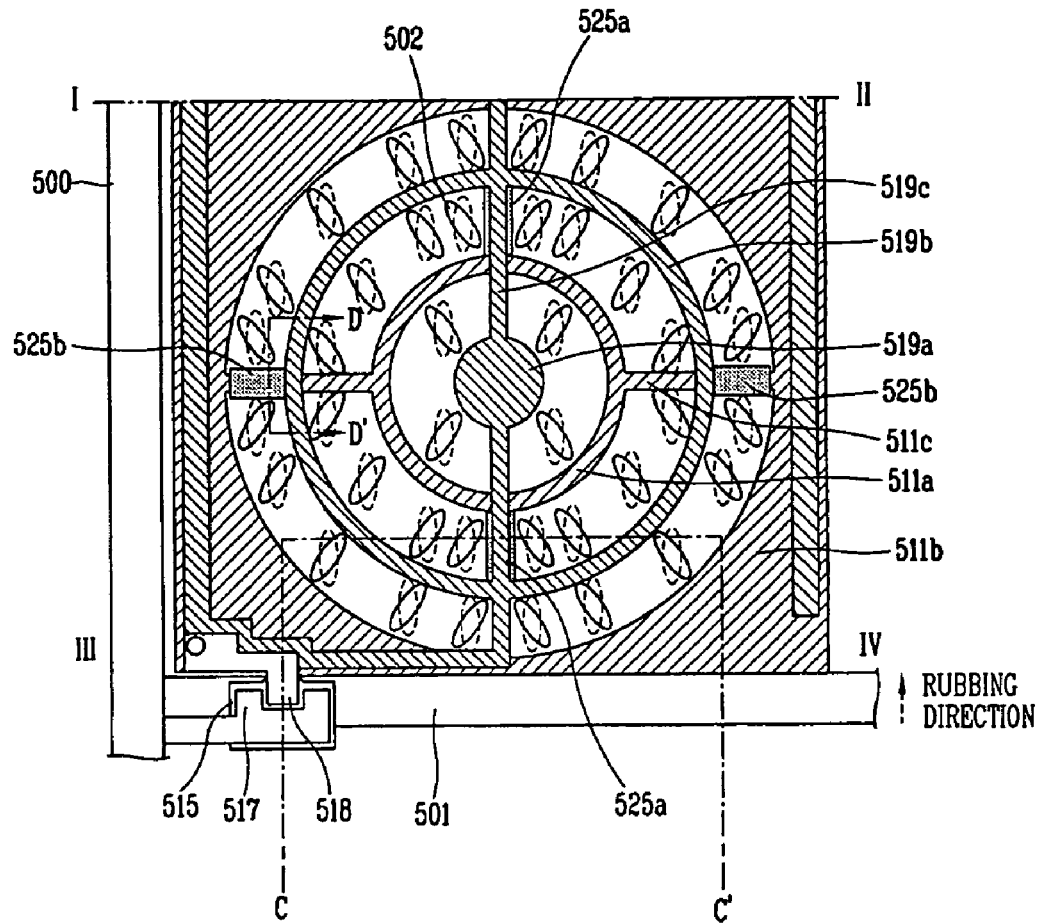
FIG. 7 is a plan view of an IPS LCD in accordance with a second embodiment of the present invention.

FIG. 7 shows a structure for minimizing the disclination in the IPS LCD in accordance with a second embodiment of the present invention. The structure of the IPS LCD of the second embodiment is similar to that of the IPS LCD in accordance with the first embodiment of the present invention, so description will be made only for parts that are different.

As shown in FIG. 7, the IPS LCD in accordance with the second embodiment of the present invention includes circular-shaped first and second pixel electrodes 519a and 519b and first and second common electrodes 511a and 511b for applying an in-plane electric field with liquid crystal molecules therebetween and a pixel electrode connection line 519c and a common electrode connection line 511c for electrically connecting the pixel electrodes and common electrodes, respectfully, in the pixel structure.

In addition, first compensation electrodes 525a are formed along the pixel electrode connection line 519c at regions where the second pixel electrode 519b and the pixel electrode connection line 519c cross at an angle smaller than a right angle, and second compensation electrodes 525b are formed at an upper side of the common electrode connection line 511c at regions where the first and second common electrodes 511b and the common electrode connection line 511c cross at an angle smaller than the right angle. The first compensation electrode 525a is formed on the first substrate 503 as the same metal layer as the common electrodes 511a and 511b and generates an additional in-plane electric field together with the second pixel electrode 519b which faces each other at an angle smaller than a right angle and compensates an electric field distorting the in-plane electric field between the first common electrode 511a and the second pixel electrode 519b.

The second compensation electrodes 525b are formed of the same transparent material as the pixel electrodes 519a and 519b on the passivation layer 520, generate an additional in-plane electric field with the second common electrode 511b which faces the angle smaller than the right angle, and compensates an electric field distorting the in-plane electric field of the LCD. The first compensation electrode 525a may be formed as a portion of the common electrodes 511a and 511b, and the second compensation electrode 525b can be formed as a portion of the pixel electrode 519a and 519b.

The first and second compensation electrodes 525a and 525b may be used to compensate the electric field which distorts the in-plane electric field in the IPS LCD. The first and second compensation electrodes 525a and 525b may have any shape or may be positioned at any place so long as they can compensate an electric field resulting from the common electrode connection line 511c and the pixel electrode connection line 519c.

Figure 8:
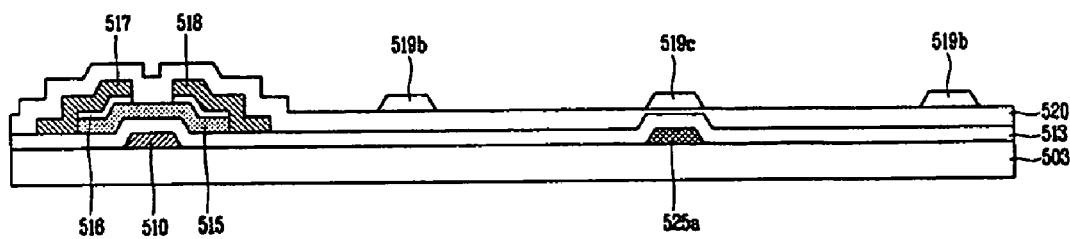
FIG. 8 is a sectional view taken along line C-C' in FIG. 6.

FIG. 8 is a sectional view taken along line C-C' in FIG. 7. As shown, the second pixel electrodes 519b and the pixel electrode connection line 519c, made of a transparent conductor such as ITO, are formed on the passivation layer 520. The first compensation electrode 525a is formed as a gate metal layer on the lower first substrate 503. Although the second pixel electrode 519b and the pixel electrode connection line 519c generate an electric field distorting the in-plane electric field on the substrate, an additional in-plane electric field is generated between the first compensation electrode 525a and the pixel electrode 519b for compensating the electric field, to compensate the distortion phenomenon.

Figure 10:
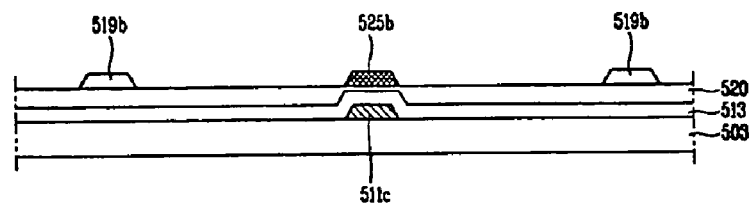
FIG. 10 is a sectional view taken along line D-D' in FIG. 7.

FIG. 10 is a sectional view taken along line D-D' in FIG. 7. As shown, the common electrode connection line 511c formed as the same metal layer as the common electrodes 511a and 511b is formed on the first substrate 503, and the second compensation electrode 525b is additionally formed as a transparent conductor on the passivation layer 520 in order to prevent distortion of the in-plane electric field. The pixel electrode 519b is formed as the transparent conductor such as ITO on the passivation layer 520, and electrically connected with the second compensation electrode 525b.

Figure 9A:
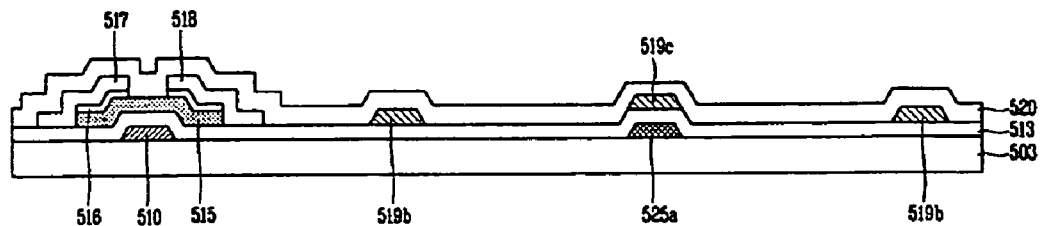
FIGS. 9A and 9B are views showing a different structure of the LCD in accordance with the second embodiment of the present invention.
Figure 9B:
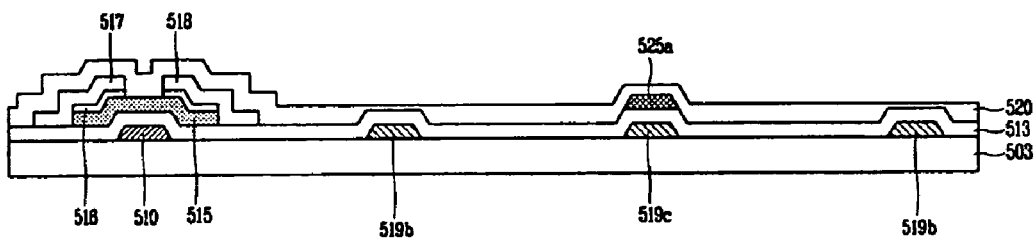

Likewise in the first embodiment of the present invention, the structure of the second embodiment is not limited to the structure shown in FIGS. 8 and 10. That is, as shown in FIGS. 9A and 9B, the common electrodes 511a and 511b and the pixel electrodes 519a and 519b can be formed of an opaque metal or as a transparent electrode, and they can be formed on the first substrate 503, on the gate insulation layer 513 or on the passivation layer 520. Also, the common electrode connection line 511c and the pixel electrode connection line 519c can be formed of the same material and at the same layer as the common electrodes 511a and 511b and the pixel electrodes 519a and 519b. The common electrodes 511a and 511b and the pixel electrodes 519a and 519b can have any structure with a curvature, as well as a simple circular shape.

Compared with the IPS LCD in accordance with the first embodiment of the present invention showing the simple connection structure in which the pixel electrode connection line 319c and the common electrode connection line 311c apply a voltage to the pixel electrodes 319a and 319b and the common electrodes 311a and 311b, in the IPS LCD in accordance with the second embodiment of the present invention, the first and second compensation electrodes 525a and 525b are additionally formed at a region where the second pixel electrode 519b and the pixel electrode connection line 519c cross at an angle smaller than the right angle and at the region where the second common electrode 511b and the common electrode connection line 511c cross at an angle smaller than the right angle, whereby uneven alignment of liquid crystal molecules due to distortion of the in-plane electric field is prevented and thus generation of the disclination phenomenon is prevented.

Because of the disposition of the first and second compensation electrodes 525a and 525b, the liquid crystal molecules 502 between the first pixel electrode 519a and the first common electrode 511a and between the second pixel electrode 519b and the second common electrode 511b can be arranged in a radial direction along the direction of the electric field substantially perpendicular to the electrode, making the alignment direction between each region symmetrical, so that diagonal color shift in the direction of the viewing angle of ±45° is compensated to enhance the viewing angle characteristics. As a result the disclination phenomenon can be prevented and the light efficiency can be enhanced.

Figure 11B:
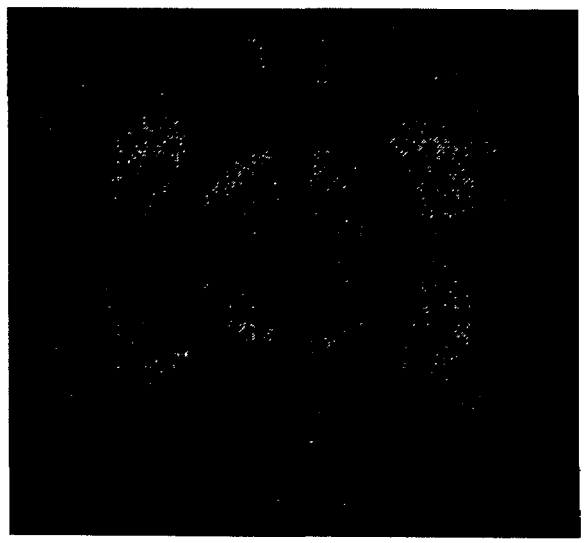
FIG. 11b shows an image indicating luminance when a voltage of 6V is applied in the IPS LCD in accordance with the second embodiment of the present invention.

FIG. 11B shows a luminance image of the IPS LCD displayed when a maximum voltage of 8V is applied to the electrodes in pixels in accordance with the second embodiment of the present invention. Compared with the case of FIG. 11A, it is noted that the disclination region disappears and the luminance is improved overall.

As a result, by adding the compensation electrodes, the luminance of the LCD can be enhanced, the control region of the alignment of the liquid crystal molecules is increased to increase response speed, and because no residual image appears, the picture quality is enhanced.

The IPS LCD of the present invention is constructed such that at least one pair of electrodes which generate the in-plane electric field are disposed in a form with a certain curvature in the pixel region of the first substrate, in order to compensate color shift in all directions to thereby enhance viewing angle characteristics.

Additionally, in the electrode structure, by forming the compensation electrodes at the region where the electrodes with the same polarity meet at the angle smaller than the right angle, the region for controlling the liquid crystal molecules can be enlarged and the light efficiency of the IPS LCD can be enhanced.

As has been described, the IPS LCD devices of the present invention have the structure that the pixel electrodes and the common electrodes are disposed in a circular form and compensation electrodes are formed along a connection line of the common and pixel electrodes. Such a structure has been described for the sake of explanation and the present invention is not limited thereto.

The basic concept of the present invention is that the first and second electrodes generating the in-plane electric field are disposed in a curvature form and a third electrode is disposed to generate a same in-plane electric field as the in-plane electric field between the first and second electrodes. Together, with at least one of the first and second electrodes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) LCD device comprising:
   first and second substrates;

gate line and data line arranged vertically and horizontally on the first substrate and defining a pixel region;

a thin film transistor (TFT) formed at a crossing of the gate line and the data line, wherein the TFT comprises a gate electrode formed on the first substrate; a gate insulation layer stacked entirely over the first substrate with the gate electrode formed thereon; a semiconductor layer formed on the gate insulation layer; source and drain electrodes formed on the semiconductor layer; and a passivation layer stacked entirely over the first substrate with the source and drain electrodes formed thereon;

at least one common electrode and at least one pixel electrode alternately disposed at the pixel region in a form with curvature and generating in-plane electric field, wherein the pixel region includes a plurality of domains formed by the common and pixel electrodes;

a common electrode connection line for electrically connecting the common electrodes and formed on the first substrate, wherein the common electrode connection line makes an angle smaller than a right angle with at least one common electrode;

a pixel electrode connection line for electrically connecting the pixel electrodes, and formed on the passivation layer, wherein the pixel electrode connection line makes an angle smaller than a right angle with at least one pixel electrode;

a compensation electrode formed along at least one of the common electrode connection line and the pixel electrode connection line and compensating electric field, wherein the compensation electrode includes a first compensation electrode formed along the pixel electrode connection line, wherein the first compensation electrode overlaps with a portion of the pixel electrode connection line, and is formed on the first substrate, and a second compensation electrode formed along the common electrode connection line, wherein the second compensation electrode overlaps with a portion of the common electrode connection line, and is formed on the passivation layer and wherein a portion of the common electrode extends to form the first compensation electrode, and a portion of the pixel electrode extends to form the second compensation electrode; and a liquid crystal layer formed between the first and second substrates, wherein the compensation electrode is located in regions where the at least one of the common electrode connection line and the pixel electrode connection line cross at an angle less 90 degrees with the respective common electrode and pixel electrode, and wherein the common electrode and the pixel electrode generate radial in-plane electric field within the pixel region.

2. The device of claim 1, wherein the compensation electrode prevents distortion of in-plane electric field between the common electrode and the pixel electrode.

3. The device of claim 1, wherein a rubbing direction of the first substrate is substantially parallel to the data line.

4. The device of claim 1, wherein the rubbing direction of the first substrate is substantially parallel to the gate line.

5. The device of claim 1, wherein the second substrate comprises:
a light blocking layer; and
a color filter formed on the light blocking layer.

6. An in-plane switching (IPS) LCD comprising:
first and second substrates;
gate line and data line arranged horizontally and vertically on the first substrate and defining a pixel region;

a TFT formed at a crossing of the gate line and the data line, wherein the TFT comprises a gate electrode formed on the first substrate; a gate insulation layer stacked entirely over the first substrate with the gate electrode formed thereon; a semiconductor layer formed on the gate insulation layer; source and drain electrodes formed on the semiconductor layer; and a passivation layer stacked entirely over the first substrate with the source and drain electrodes formed thereon;

at least one first and second electrodes alternately disposed at the pixel region in a form with a curvature and generating in-plane electric field in a first direction, wherein the pixel region includes a plurality of domains formed by the first and second electrodes;

a first electrode connection line for electrically connecting the first electrodes and formed on the first substrate, wherein the first electrode connection line makes an angle smaller than a right angle with at least the first electrode;

a second electrode connection line for electrically connecting the second electrodes and formed on the passivation layer, wherein the second electrode connection line makes an angle smaller than a right angle with at least the second electrode;

a third electrode formed along at least one of the first and second electrode connection lines and forming a in-plane electric field in a first direction with at least one of the first and second electrodes, wherein the third electrode includes a first compensation electrode formed along the first electrode connection line, wherein the first compensation electrode overlaps with a portion of the second electrode connection line, and is formed on the first substrate, and a second compensation electrode formed along the second electrode connection line, wherein second compensation electrode overlaps with a portion of the first electrode connection line, and formed on the passivation layer, and wherein a portion of the first electrode extends to form the first compensation electrode, and a portion of the second electrode extends to form the second compensation electrode, and wherein the first compensation electrode is formed on the first substrate; and the second compensation electrode is formed on the passivation layer; and a liquid crystal layer formed between the first and second substrates, wherein the third electrode is located in regions where the first electrode connection line and the second electrode connection line cross at an angle less 90 degrees with the respective first and second electrodes, and wherein the first and second electrodes generate radial in-plane electric field within the pixel region.

7. An in-plane switching (IPS) LCD device comprising:
first and second substrates;
gate line and data line arranged vertically and horizontally on the first substrate and defining a pixel region;

a thin film transistor (TFT) formed at a crossing of the gate line and the data line, wherein the TFT comprises a gate electrode formed on the first substrate; a gate insulation layer stacked entirely over the first substrate with the gate electrode formed thereon; a semiconductor layer formed on the gate insulation layer; source and drain electrodes formed on the semiconductor layer; and a passivation layer stacked entirely over the first substrate with the source and drain electrodes formed thereon;

at least one common electrode and at least one pixel electrode alternately disposed at the pixel region in a form with curvature and generating in-plane electric field, wherein the pixel region includes a plurality of domains by the common and pixel electrodes;

a common electrode connection line for electrically connecting the common electrodes, and formed on the first substrate, wherein the common electrode connection line makes an angle smaller than a right angle with at least one common electrode;

a pixel electrode connection line for electrically connecting the pixel electrodes, and formed on the passivation layer, wherein the pixel electrode connection line makes an angle smaller than a right angle with at least one pixel electrode;

a compensation electrode formed along at least one of the common electrode connection line and the pixel electrode connection line and compensating electric field, wherein the compensation electrode includes a first compensation electrode formed along the pixel electrode connection line, and a second compensation electrode formed along the common electrode connection line, wherein the first compensation electrode overlaps with a portion of the pixel electrode connection line, and is formed on the first substrate, and wherein a portion of the common electrode extends to form the first compensation electrode, wherein the second compensation electrode overlaps with a portion of the pixel electrode connection line, and is formed on the passivation layer and a portion of the pixel electrode extends to form the second compensation electrode, and wherein the first compensation electrode is formed on the first substrate; and the second compensation electrode is formed on the passivation layer; and a liquid crystal layer formed between the first and second substrate.

* * * * *